United States Patent
Cheng et al.

(10) Patent No.: US 12,537,931 B2
(45) Date of Patent: Jan. 27, 2026

(54) DISPLAY APPARATUS INCLUDING AN IMAGING STRUCTURE COMPRISING LIGHT-SHIELDING LAYER AND METHOD FOR MAUFACTURING SAME

(71) Applicant: BOE Technology Group Co., Ltd., Beijing (CN)

(72) Inventors: Fang Cheng, Beijing (CN); Jian Gao, Beijing (CN); Sen Ma, Beijing (CN); Qingxun Zhang, Beijing (CN); Yanliu Sun, Beijing (CN); Chengfu Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 305 days.

(21) Appl. No.: 18/253,735

(22) PCT Filed: Dec. 22, 2020

(86) PCT No.: PCT/CN2020/138414
§ 371 (c)(1),
(2) Date: May 19, 2023

(87) PCT Pub. No.: WO2022/133751
PCT Pub. Date: Jun. 30, 2022

(65) Prior Publication Data
US 2024/0015275 A1   Jan. 11, 2024

(51) Int. Cl.
*H04N 13/332* (2018.01)
*G02B 27/01* (2006.01)
(Continued)

(52) U.S. Cl.
CPC ........... *H04N 13/332* (2018.05); *H04N 13/00* (2013.01); *H04N 13/31* (2018.05);
(Continued)

(58) Field of Classification Search
None
See application file for complete search history.

(56) References Cited

U.S. PATENT DOCUMENTS

| 10,205,935 B2 | 2/2019 | Ledentsov et al. |
| 10,557,884 B2 | 2/2020 | Kamath et al. |
| (Continued) | | |

FOREIGN PATENT DOCUMENTS

| CN | 103246071 A | 8/2013 |
| CN | 103918257 A | 7/2014 |
| (Continued) | | |

OTHER PUBLICATIONS

International Search Report and Written Opinion, mailed Sep. 1, 2021, from PCT/CN2020/138414, 12 pages.
(Continued)

*Primary Examiner* — Mohammed Jebari
(74) *Attorney, Agent, or Firm* — Workman Nydegger (57) ABSTRACT

Provided are a display apparatus and a method for manufacturing the same. The display apparatus comprises: a display panel, which comprises a plurality of pixel groups, wherein each pixel group comprises a plurality of pixels; a light-transmitting spacer layer, which is located on a light-emitting side of the display panel; and an imaging structure, which is located on the side of the light-transmitting spacer layer facing away from the display panel, and comprises a light-shielding layer, wherein the light-shielding layer comprises a plurality of light-transmitting holes matching the pixel groups, light rays emitted by the pixels pass through the light-transmitting holes, and light rays emitted by at least two pixels pass through the light-transmitting holes so as to simultaneously enter a monocular pupil of a user.

15 Claims, 8 Drawing Sheets

(51) Int. Cl.
*H04N 13/00* (2018.01)
*H04N 13/31* (2018.01)
*H04N 13/351* (2018.01)

(52) U.S. Cl.
CPC .............. *G02B 2027/0127* (2013.01); *G02B 2027/0134* (2013.01); *H04N 13/351* (2018.05); *H04N 2213/001* (2013.01)

(56) References Cited

U.S. PATENT DOCUMENTS

| | | | |
|---|---|---|---|
| 2012/0182407 A1* | 7/2012 | Yoshida | G03B 35/18 |
| | | | 348/54 |
| 2012/0274542 A1* | 11/2012 | Yamazaki | H04N 13/324 |
| | | | 345/32 |
| 2013/0155505 A1* | 6/2013 | Kim | G02B 30/27 |
| | | | 359/464 |
| 2014/0300711 A1 | 10/2014 | Kroon et al. | |
| 2015/0002940 A1 | 1/2015 | Nister et al. | |
| 2015/0015814 A1 | 1/2015 | Qin | |
| 2016/0001675 A1 | 1/2016 | Kazuno et al. | |
| 2016/0070104 A1* | 3/2016 | Yang | G02B 3/08 |
| | | | 359/13 |
| 2016/0116752 A1* | 4/2016 | Wu | H04N 13/356 |
| | | | 359/462 |
| 2016/0125814 A1 | 5/2016 | Sumi | |
| 2017/0068130 A1* | 3/2017 | Chen | G02F 1/133377 |
| 2018/0014007 A1* | 1/2018 | Brown | G02B 17/002 |
| 2018/0343434 A1* | 11/2018 | Perreault | G02B 27/0172 |
| 2019/0155044 A1 | 5/2019 | Gao et al. | |
| 2019/0213379 A1* | 7/2019 | Zhao | H10K 50/865 |
| 2019/0265476 A1* | 8/2019 | Blum | G02B 3/0056 |
| 2020/0174278 A1 | 6/2020 | Zhu et al. | |
| 2020/0225487 A1 | 7/2020 | Huang et al. | |
| 2020/0310135 A1* | 10/2020 | Fattal | G02B 27/106 |
| 2021/0314553 A1* | 10/2021 | Teng | H04N 13/307 |

FOREIGN PATENT DOCUMENTS

| | | |
|---|---|---|
| CN | 105378540 A | 3/2016 |
| CN | 105572884 A | 5/2016 |
| CN | 105657417 A | 6/2016 |
| CN | 205787364 U | 12/2016 |
| CN | 107067980 A | 8/2017 |
| CN | 107105216 A | 8/2017 |
| CN | 107153270 A | 9/2017 |
| CN | 108469682 A | 8/2018 |
| CN | 108803060 A | 11/2018 |
| CN | 109557666 A | 4/2019 |
| JP | 2011033819 A | 2/2011 |
| WO | 2013159264 A1 | 10/2013 |
| WO | 2017096751 A1 | 6/2017 |

OTHER PUBLICATIONS

Chinese First Office Action, mailed Sep. 29, 2023, from Chinese App. No. 202080003510.8, 17 pages.
International Search Report cited in PCT/CN2020/138414 dated Sep. 1, 2021, 4 pages.

* cited by examiner

DISPLAY APPARATUS INCLUDING AN IMAGING STRUCTURE COMPRISING LIGHT-SHIELDING LAYER AND METHOD FOR MAUFACTURING SAME

The present application is a National Stage of International Application No. PCT/CN2020/138414, filed on Dec. 22, 2020, which is hereby incorporated by reference in its entirety.

FIELD

The present disclosure relates to the technical field of display, and particularly to a display apparatus and a method for manufacturing the same.

BACKGROUND

In the current near-to-eye display technology, stereoscopic vision is formed by displaying different images of a three-dimensional (3D) object to the left and right eyes of a user respectively. However, 3D display based on stereoscopic vision of human eyes will cause vergence-accommodation conflict, that is, monocular focusing and binocular convergence are not on one plane, and the vergence-accommodation conflict will cause visual fatigue and vertigo. In view of that, how to solve the problem of vergence-accommodation conflict becomes an urgent problem to be solved.

SUMMARY

An embodiment of the present disclosure provides a display apparatus. The display apparatus includes: a display panel, including a plurality of pixel groups, where each of the pixel groups includes a plurality of pixels; a light-transmitting spacer layer on a light-emitting side of the display panel; and an imaging structure on a side of the light-transmitting spacer layer facing away from the display panel, including a light-shielding layer, where the light-shielding layer includes a plurality of light-transmitting holes matching the pixel groups; where light rays emitted by the pixels pass through the light-transmitting holes, and light rays emitted by at least two of the pixels pass through the light-transmitting holes so as to simultaneously enter a monocular pupil of a user.

In some embodiments, a difference between light fluxes passing through any two different light-transmitting holes is less than a preset value.

In some embodiments, the plurality of light-transmitting holes are arranged in an array in a first direction and a second direction, where the first direction intersects the second direction; different straight lines parallel to the first direction pass through the same number of light-transmitting holes; and different straight lines parallel to the second direction pass through the same number of light-transmitting holes.

In some embodiments, radiuses of image spots formed by the light rays emitted by the pixel groups passing through the light-transmitting holes are less than or equal to a distance between adjacent image points formed by the light rays emitted by the pixel groups passing through the light-transmitting holes.

In some embodiments, an aperture of the light-transmitting hole and a distance between centers of two adjacent light-transmitting holes satisfy conditions as follows:

$$O = \sqrt{\frac{2.44\lambda DL}{e}}; \text{ and}$$

$$\frac{e\left(P_{\_p} + \sqrt{\frac{2.44\lambda DL}{e}}\right)}{2DL} + \frac{1.22\lambda}{\sqrt{\frac{2.44\lambda DL}{e}}} \leq \frac{D}{L};$$

where O is an aperture of a light-transmitting hole, e is an eye box of the display apparatus, L is a distance between a human eye and the light-shielding layer, D is a distance between centers of the two adjacent light-transmitting holes, $\lambda$ is a wavelength of the light ray emitted by the pixel, and $P_{\_p}$ is a pixel size.

In some embodiments, a thickness f of the light-transmitting spacer layer satisfies a condition as follows:

$$f = \frac{D}{ne}L;$$

where n is a refractive index of the light-transmitting spacer layer.

In some embodiments, the light ray emitted by each pixel corresponds to one sight point; and a number N of sight points of a monocular entrance pupil of the user satisfies a condition as follows:

$$N = \frac{\phi D}{eP_{\_p}};$$

where $\phi$ is a diameter of a pupil.

In some embodiments, each of the pixel groups includes one light-emitting region, and only the light rays emitted by the pixels in the light-emitting region pass through the light-transmitting holes during display.

In some embodiments, the display apparatus further includes a light-transmitting layer on a side of the light-shielding layer facing away from the light-transmitting spacer layer.

An embodiment of the present disclosure provides a method for manufacturing a display apparatus. The method includes: manufacturing a display panel, where the display panel includes a plurality of pixel groups, and the pixel group includes a plurality of pixels; providing a light-transmitting spacer layer; forming a light-shielding layer on a light-transmitting substrate, and forming a plurality of light-transmitting holes matching the pixel groups on the light-shielding layer through a patterning process to obtain an imaging structure; and attaching the display panel, the light-transmitting spacer layer and the imaging structure to each other, so as to arrange the light-transmitting spacer layer on a light-emitting side of the display panel, and arrange he light-transmitting holes on a side of the light-transmitting spacer layer facing away from the display panel; where light rays emitted by the pixels pass through the light-transmitting holes, and light rays emitted by at least two of the pixels pass through the light-transmitting holes so as to simultaneously enter a monocular pupil of a user.

In some embodiments, the light-transmitting spacer layer is reused as the light-transmitting substrate; the forming a light-shielding layer on a light-transmitting substrate specifically includes: forming the light-shielding layer on the light-transmitting spacer layer; and forming the light-transmitting holes on the light-shielding layer through the patterning process; and the attaching the display panel, the light-transmitting spacer layer and the imaging structure to each other specifically includes: attaching a side of the light-transmitting spacer layer facing away from the light-shielding layer to the display panel.

BRIEF DESCRIPTION OF THE DRAWINGS

In order to describe technical solutions in embodiments of the present disclosure more clearly, accompanying drawings required for describing the embodiments will be briefly introduced below. Apparently, accompanying drawings in the following description show merely some embodiments of the present disclosure, and those of ordinary skill in the art would also be able to derive other accompanying drawings from these accompanying drawings without making creative efforts.

DETAILED DESCRIPTION OF THE EMBODIMENTS

In order to make objectives, technical solutions and advantages of embodiments of the present disclosure clearer, technical solutions in the embodiments of the present disclosure will be clearly and completely described below in combination with accompanying drawings in the embodiments of the present disclosure. Apparently, the described embodiments are merely some embodiments rather than all embodiments of the present disclosure. In addition, embodiments of the present disclosure and features in the embodiments can be combined with each other without conflict. On the basis of the described embodiments of the present disclosure, all other embodiments obtained by those of ordinary skill in the art without making creative efforts all fall within the scope of protection of the present disclosure.

Unless otherwise defined, technical terms or scientific terms used in the present disclosure should have the ordinary meanings understood by those of ordinary skill in the art to which the present disclosure belongs. "First", "second" and other similar words used in the present disclosure do not indicate any order, quantity or importance, but are merely used to distinguish between different components. "Include", "comprise" or other similar words mean that an element or object appearing before the word contains elements or objects listed after the word and equivalents thereof, without excluding other elements or objects. "Connected", "connected to each other" or other similar words are not limited to physical or mechanical connections, but can include electrical connections, whether direct or indirect.

It should be noted that sizes and shapes of all figures in accompanying drawings do not reflect true scales and are merely intended to illustrate contents of the present disclosure. Moreover, the same or similar reference numerals denote the same or similar elements or elements having the same or similar functions throughout.

Figure 1:
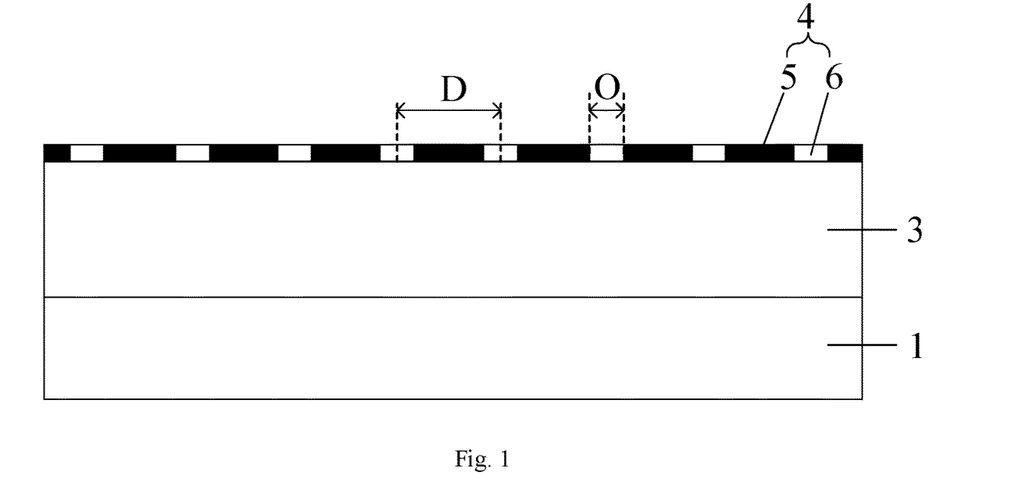
FIG. 1 is a schematic structural diagram of a display apparatus according to an embodiment of the present disclosure.

An embodiment of the present disclosure provides a display apparatus. As shown in FIG. 1, the display apparatus includes: a display panel 1, which includes a plurality of pixel groups, where each pixel group includes a plurality of pixels; a light-transmitting spacer layer 3, which is located on a light-emitting side of the display panel 1; and an imaging structure 4, which is located on a side of the light-transmitting spacer layer 3 facing away from the display panel 1, and includes a light-shielding layer 5, where the light-shielding layer 5 includes a plurality of light-transmitting holes 6 matching the pixel groups; where light rays emitted by the pixels pass through the light-transmitting holes 6, and light rays emitted by at least two pixels pass through the light-transmitting holes 6 so as to simultaneously enter a monocular pupil of a user.

The display apparatus provided in an embodiment of the present disclosure is a three-dimensional (3D) display apparatus based on light field display, and the light field display may realize a real 3D scene as a real world. Generally, light beams having a known direction are called field light ray rays in space, which is called light field for short. In a light field, light beams entering an eye pupil are required to have intersection points for spatial imaging. Therefore, it can be known from the geometric relation that collimated light beams emitted by two or above pixels are required to simultaneously enter a monocular pupil, and one pixel represents one light ray corresponding to one sight point, that is, the monocular pupil is required to simultaneously receive at least two sight points. Thus, the light rays emitted by the pixels are transmitted to the pupil through the light-transmitting holes to form a viewing region. The light field may display a surface of monocular depth of field in an adjustable manner, and through focusing of a crystalline lens of a human eye, different surfaces depth of fields may be switched between a clear state and a blurred state, such that monocular focusing and binocular convergence may be on one plane.

According to the display apparatus provided in an embodiment of the present disclosure, an imaging structure with light-transmitting holes are arranged on the light-emitting side of the display panel, and the distance between the imaging structure and the display panel is ensured by arranging the light-transmitting spacer layer between the imaging structure and the display panel. In this way, light rays emitted by different pixels in the display panel may reach a pupil of a human eye through the corresponding light-transmitting holes, and light rays emitted by at least two pixels may simultaneously enter the monocular pupil of the user through the light-transmitting holes. Therefore, 3D display of the near-to-eye light field may be implemented, monocular focusing and binocular convergence may be on one plane, and visual fatigue and vertigo may not occur. In addition, the process for providing light-transmitting holes is simple such that increase in difficulty in manufacturing the display apparatus may be avoided.

In some embodiments, the number of pixel groups is equal to the number of light-transmitting holes.

Figure 2:
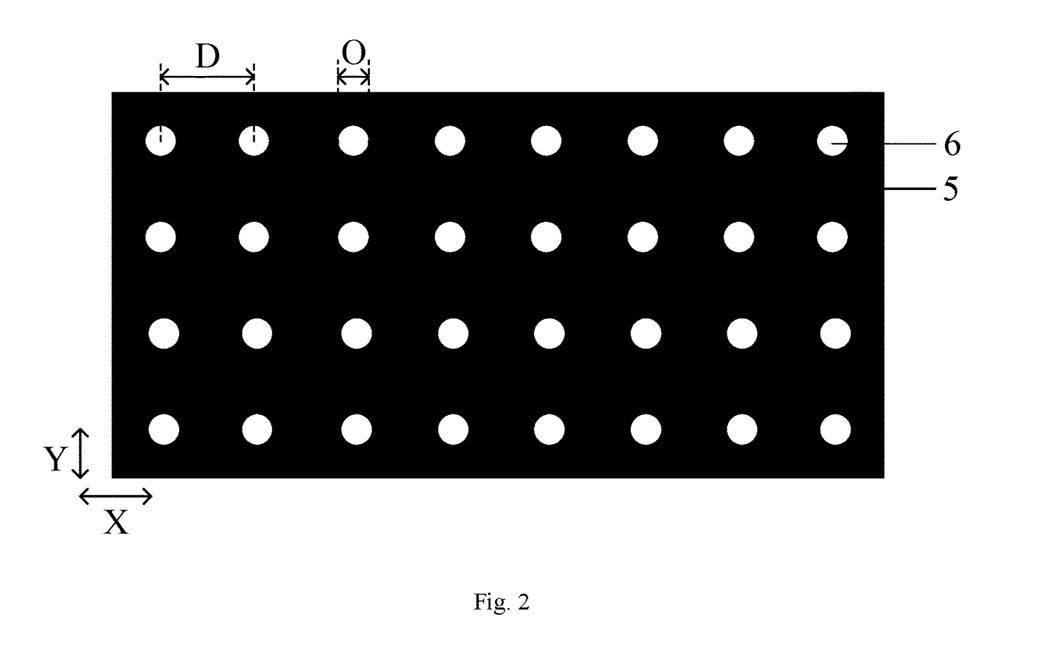
FIG. 2 is a top view of a light-shielding layer and light-transmitting holes of a display apparatus according to an embodiment of the present disclosure.

In some embodiments, a top view of a light-shielding layer and light-transmitting holes is as shown in FIG. 2, and a shape of an orthographic projection of the light-transmitting hole on a plane on which the display apparatus is located is circular.

In some embodiments, a difference between light fluxes passing through any two different light-transmitting holes is less than a preset value.

During specific implementation, the preset value may be set according to actual requirements.

In some embodiments, the preset value is greater than 0.

Alternatively, in some embodiments, the preset value is 0.

In some embodiments, as shown in FIGS. 1 and 2, apertures O of the light-transmitting holes are equal to each other.

In some embodiments, as shown in FIG. 2, the plurality of light-transmitting holes are arranged in an array in a first direction X and a second direction Y, where the first direction X intersects the second direction Y. In FIG. 2, the first direction X is perpendicular to the second direction Y.

Different straight lines parallel to the first direction X pass through the same number of light-transmitting holes 6; and different straight lines parallel to the second direction Y pass through the same number of light-transmitting holes 6.

That is, the numbers of the light-transmitting holes in different rows of the light-transmitting hole array are the same, and the numbers of the light-transmitting holes in different columns are the same.

In some embodiments, as shown in FIGS. 1 and 2, in an arrangement direction of the light-transmitting holes 6, a distance D between centers of any two adjacent light-transmitting holes 6 is equal to each other.

That is, in the first direction X, a distance D between centers of any two adjacent light-transmitting holes 6 is equal to each other, in the second direction Y, a distance D between centers of any two adjacent light-transmitting holes 6 is equal to each other, and the distance D between the centers of any two adjacent light-transmitting holes 6 in the first direction X is equal to the distance D between the centers of any two adjacent light-transmitting holes 6 in the second direction Y.

Figure 3:
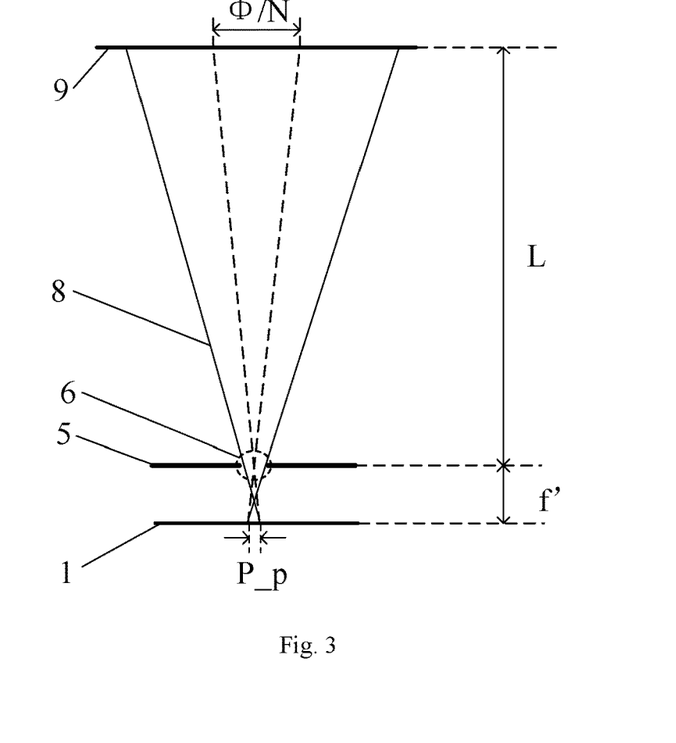
FIG. 3 is a schematic diagram of an imaging principle of a display apparatus according to an embodiment of the present disclosure.

Next, an implementation principle of a display apparatus according to an embodiment of the present disclosure will be specifically described. As shown in FIG. 3, light emitted by one pixel in the display panel 1 corresponds to one light ray 8, and one light ray 8 corresponds to one sight point. According to the display apparatus provided in an embodiment of the present disclosure, N sight points spread on an eye pupil 9, and the pupil has a diameter of $\Phi$, such that the component of each sight point in the eye pupil 9 is $\Phi/N$. According to properties of similar triangles, it can be known that $$\frac{\Phi/N}{P\_p} = \frac{L}{f'}. \tag{1}$$

Where L is a distance between a human eye and the light-shielding layer, that is, a viewing distance, P_p is a pixel size, and f' is a thickness of an air layer equivalent to the light-transmitting spacer layer.

Figure 4:
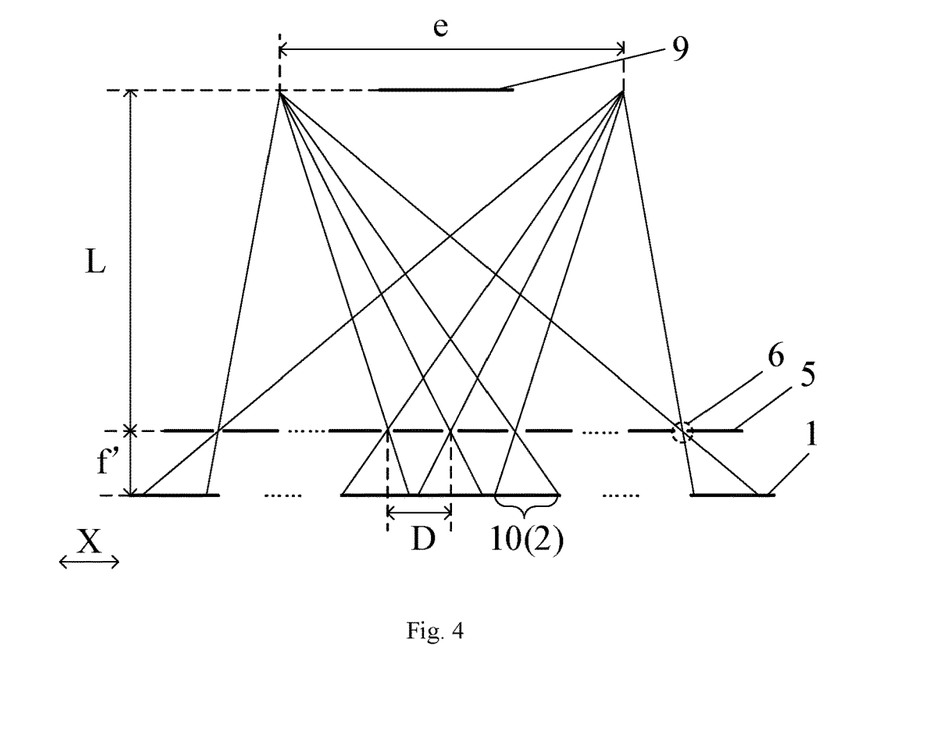
FIG. 4 is a schematic diagram of a preset drawing rule of a display apparatus according to an embodiment of the present disclosure.

During specific implementation, as shown in FIG. 4, all pixels on the display panel are designed to be projected into an eye box. According to properties of similar triangles, it can be known that $$\frac{D}{e} = \frac{f'}{L}. \tag{2}$$

Where e is an eye box of the display apparatus. Generally, a length of the eye box is equal to a width of the eye box, and only the eye box in the first direction X is shown in FIG. 4.

Figure 5:
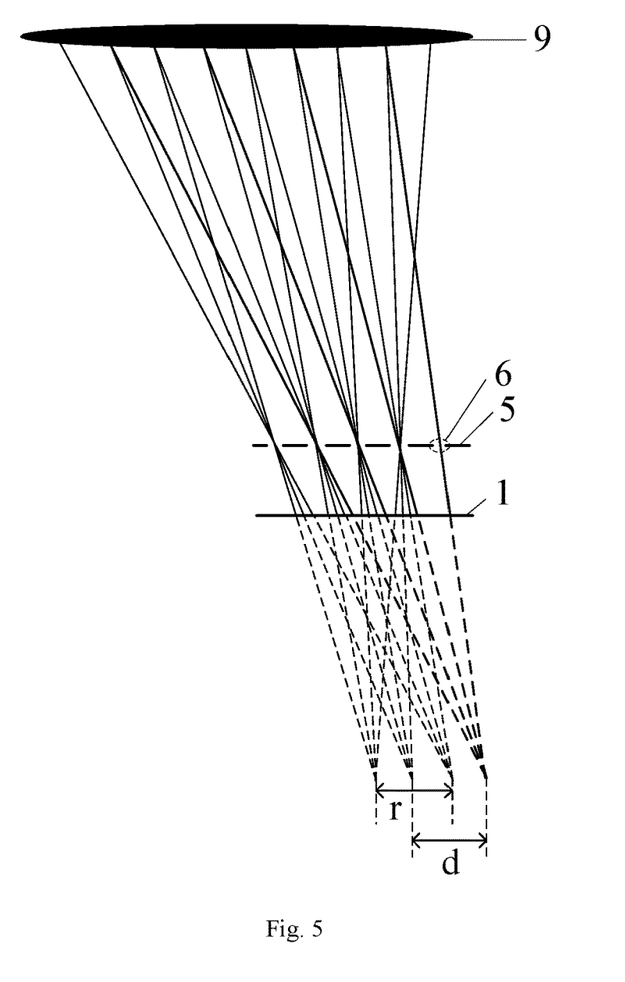
FIG. 5 is a schematic imaging diagram of a display apparatus according to an embodiment of the present disclosure.

It should be noted that the light rays emitted by the pixels pass through the light-transmitting holes and are emitted to a crystalline lens of an eye pupil of a human eye, and then converges on a retina. As shown in FIG. 5, for light rays passing through the light-transmitting holes and reaching the eye pupil, if reverse extension lines of the plurality of light rays converge to one point, the light rays converge to one image point on a retina after entering the human eye, and if the reverse extension lines of the plurality of light rays converge to different points, the light rays converge to different image points on the retina after entering the human eye. As shown in FIG. 5, a distance between adjacent image points is d. Due to the existence of a light-transmitting hole array, the light rays form images spots after the light rays emitted by the pixels passes through the light-transmitting holes, each of the image spot has a radius of r, and the image spots are formed by superposing geometric image spots and diffraction image spots. It should be noted that a radius of an image spot of one surface of depth of field and adjacent image points of one surface of depth of field are taken as an example in FIG. 5 for illustration.

In some embodiments, as shown in FIG. 5, a radius of an image spot formed by the light rays emitted by the pixels passing through the light-transmitting holes is less than or equal to a distance between adjacent image points formed by the light rays emitted by the pixels passing through the light-transmitting holes. That is, $$r \leq d \tag{3}.$$

Therefore, it is ensured that in the display apparatus provided in embodiments of the present disclosure, adjacent pixels are clearly imaged, and a 3D display effect is ensured.

Since the image spots are formed by superposing geometric image spots and diffraction image spots, the image spot has a radius r of $$r = \left(\frac{P\_p + O}{2f} + \frac{1.22\lambda}{o}\right)L'. \tag{4}$$

Where λ is a wavelength of the light ray emitted by a pixel, and L' is a distance between a surface of depth of field and the light-shielding layer.

According to properties of similar triangles, a distance d between adjacent image points is:

$$d = \frac{D}{L}(L' + L). \quad (5)$$

Where L' is the distance between a surface of depth of field and the light-shielding layer.

Formula (4) and formula (5) are substituted into formula (3) to obtain:

$$\left(\frac{P_{-p} + O}{2f} + \frac{1.22\lambda}{O}\right)L' \le \frac{D}{L}(L' + L). \quad (6)$$

During near-to-eye viewing, there is a relational expression L<<L', and formula (6) has an approximation as follows:

$$\frac{P_{-p} + O}{2f} + \frac{1.22\lambda}{O} \le \frac{D}{L}. \quad (7)$$

Where $$\frac{P_{-p} + O}{2f}$$

is a geometric effect, and $$\frac{1.22\lambda}{O}$$

is a diffraction effect. The larger an opening of the light-transmitting hole, the larger a radius of an image spot caused by the geometric effect; and the smaller the opening of the light-transmitting hole, the larger the radius of the image spot caused by the diffraction effect.

In order to improve imaging quality, it is required to balance the geometric effect and the diffraction effect to minimize the radius r of the image spot. In combination with formula (2) and formula (4), in some embodiments, an aperture of the light-transmitting hole satisfies a condition as follows:

$$O = \sqrt{\frac{2.44\lambda DL}{e}}. \quad (8)$$

That is, the aperture O of the light-transmitting hole corresponding to the minimum value of r may be obtained according to formula (8).

Formula (8) is substituted into formula (7), and in some embodiments, the distance between the centers of two adjacent light-transmitting holes satisfies a condition as follows:

$$\frac{e\left(P_{-p} + \sqrt{\frac{2.44\lambda DL}{e}}\right)}{2DL} + \frac{1.22\lambda}{\sqrt{\frac{2.44\lambda DL}{e}}} \le \frac{D}{L}. \quad (9)$$

It can be seen from formula (9) that when the distance D between the centers of two adjacent light-transmitting holes is increased, a value on a left side of the inequality becomes less, and a value on a right side of the inequality becomes greater.

It should be noted that when a display apparatus is designed, light field design resolution is required to be considered. In an embodiment of the present disclosure, the light field design resolution refers to an angular resolution of each surface of depth of field, and the angular resolutions of surfaces of depth of fields are equal to each other.

The expression of the angular resolution α is:

$$\alpha = \frac{D}{L} \times \frac{180}{\pi} \times 60. \quad (11)$$

According to formula (11), it can be seen that the angular resolution α is related to the distance D between the centers of two adjacent light-transmitting holes and the viewing distance L, and the less the angular resolution, the higher the light field resolution. Therefore, the following conclusions are drawn: under the condition that the distance D between the centers of two adjacent light-transmitting holes is constant, the larger the viewing distance L, the higher the light field design resolution, and the less the viewing distance L, the lower the light field design resolution. Under the condition that the viewing distance L is constant, the less the distance D between the centers of two adjacent light-transmitting holes, the higher the light field design resolution, and the larger the distance D between the centers of two adjacent light-transmitting holes, the lower the light field design resolution.

Since under the condition that the viewing distance L is constant, the less the distance D between the centers of two adjacent light-transmitting holes, and the higher the light field design resolution. In order to obtain a light field imaging effect having the highest light field design resolution, it is required to design a minimum distance D between the centers of two adjacent light-transmitting holes. In the case of $$\frac{e\left(P_{-p} + \sqrt{\frac{2.44\lambda DL}{e}}\right)}{2DL} + \frac{1.22\lambda}{\sqrt{\frac{2.44\lambda DL}{e}}} = \frac{D}{L},$$

the minimum value of the distance D between the centers of two adjacent light-transmitting holes that satisfy the clear imaging condition that the radius of the image spot is less than or equal to the image point interval may be obtained, and moreover, the highest light field design resolution satisfying the clear imaging condition may be obtained. According to the display apparatus provided in an embodiment of the present disclosure, for different eye boxes e, viewing distances L, and pixel sizes P_p, the distance D between the centers of two adjacent light-transmitting holes may be flexibly designed, so as to obtain an optimal imaging effect.

In some embodiments, the thickness f' of the air layer equivalent to the light-transmitting spacer layer may be determined according to the minimum value of the distance D between the centers of two adjacent light-transmitting holes and formula (2), $$f' = \frac{D}{e}L, \text{ and } f = \frac{f'}{n}.$$

Therefore, in some embodiments, the thickness f of the light-transmitting spacer layer satisfies a condition as follows:

$$f = \frac{D}{ne}L; \quad (12)$$

where n is a refractive index of the light-transmitting spacer layer.

In some embodiments, the light ray emitted by each pixel corresponds to one sight point; the number N of sight points of a monocular entrance pupil of a user may be determined according to the distance D between the centers of two adjacent light-transmitting holes, formula (1) and formula (2); and the number N of sight points of a monocular entrance pupil of a user satisfies a condition as follows:

$$N = \frac{\phi D}{eP_{-p}}. \quad (12)$$

Figure 6:
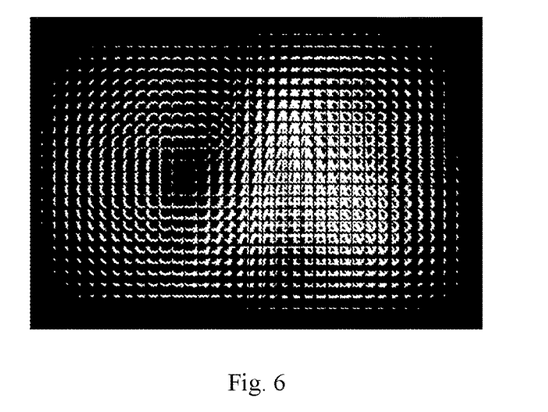
FIG. 6 is a light field diagram, in which three surfaces of depth of fields are superimposed, of a display apparatus according to an embodiment of the present disclosure.
Figure 7:
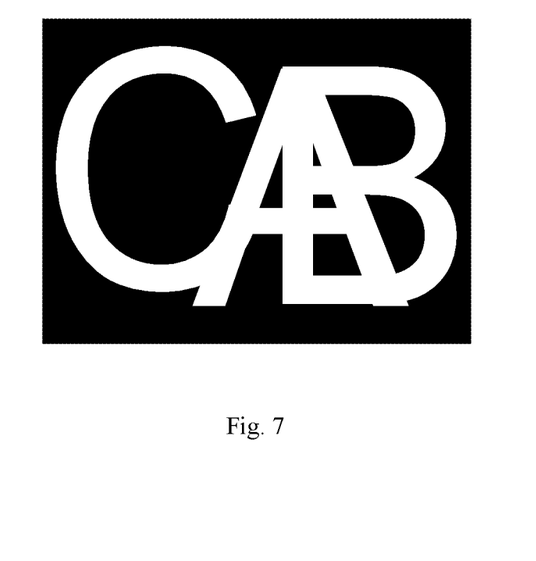
FIG. 7 is a viewing effect diagram of FIG. 6 viewed by human eyes through a light-transmitting hole array according to an embodiment of the present disclosure.

Next, a light field drawing rule of a display apparatus provided in an embodiment of the present disclosure will be briefly introduced. It should be noted that the display apparatus stores a preset light field drawing rule matching each parameter of the display apparatus, so as to obtain a display image of the display panel corresponding to a 3D image to be displayed. During specific implementation, a light field database is established according to coordinate information of the light-transmitting holes of the display apparatus and coordinate information of the pixels of the display panel, so as to obtain light field information matching the display apparatus, where one pixel represents one light ray. It is further required to define a region at which each light-transmitting hole corresponds to a pixel. When a display image of a display panel corresponding to a 3D image to be displayed is determined, in combination with the light field information database, a surface of depth of field to be displayed intersects a spatial light ray field. Pixels on the display panel are determined according to a mapping relation, so as to obtain a light field rendered image of the surface of depth of field. The light field images of surfaces of the depth of fields obtained through rendering are superimposed together, and corresponding display information is given to drive the pixels to emit light. In this way, by means of a light-transmitting hole array, a 3D scene that is the same as a real world and may be viewed by human eyes through focusing may be restored. For example, a light field image in which three surfaces of depth of fields are superimposed together is as shown in FIG. 6, human eye views the image by means of the light-transmitting hole array, and an effect as shown in FIG. 7 may be seen. It should be noted that during viewing by human eyes, when an object is located at a forefront without blocking, human eyes obtain more information. When an object is located at a rear, human eyes obtain less information due to blocking. Therefore, when a stereo image of multiple surfaces of depth of fields is subjected to light field image rendering one by one, it should be noted that light rays used for a surface of front depth of field may not be reused for a surface of rear depth of field, such that a foreground, which is the same as the viewed real world, may have a certain blocking relation with a background. Thus, by means of the display image of the display panel obtained according to the preset light field drawing rule and corresponding to the 3D image to be displayed, after the display image is displayed by the display panel and passes through the light-transmitting holes, a 3D image that is the same as the real world may be restored.

Figure 8:
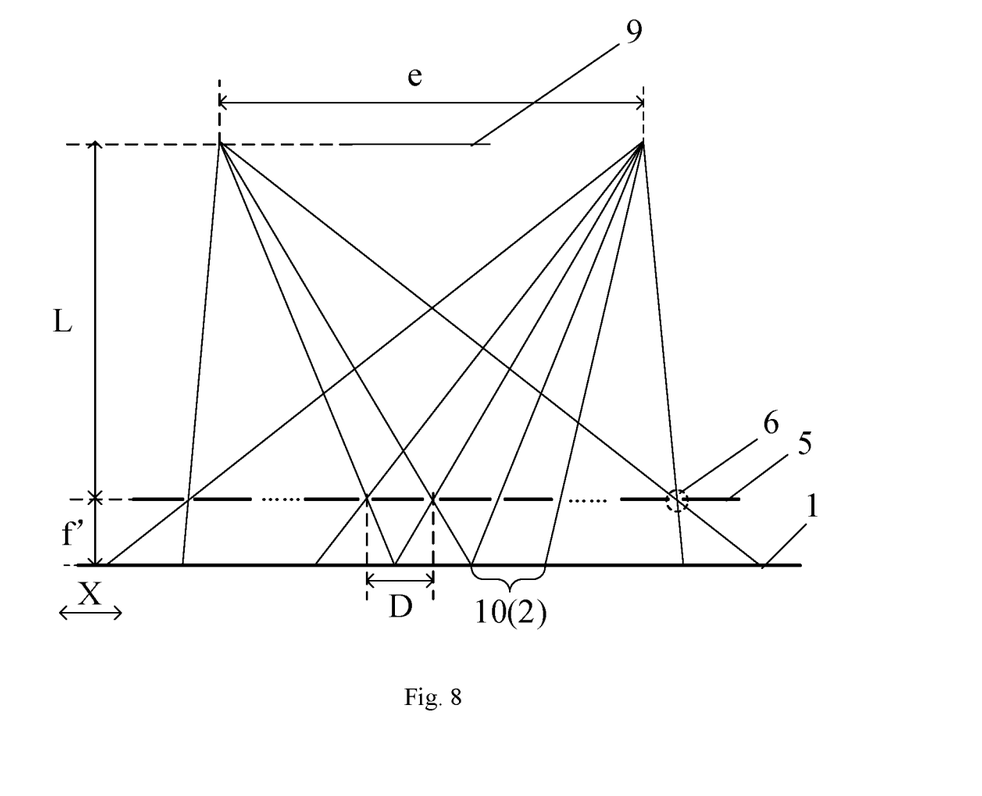
FIG. 8 is a schematic diagram of another preset drawing rule of a display apparatus according to an embodiment of the present disclosure.

In some embodiments, as shown in FIGS. 4 and 8, each pixel group 2 includes a light-emitting region 10, and only the light rays emitted by the pixels in the light-emitting region 10 pass through the light-transmitting holes during display. That is, the light-emitting region is a region in which each light-transmitting hole corresponds to the pixels in the preset light field drawing rule.

In some embodiments, as shown in FIG. 8, in the preset light field drawing rule, a region in which each light-transmitting hole corresponds to the pixels is in close contact with each other, that is, a distance between adjacent light-emitting regions is equal to 0. That is, all pixels in each pixel group are located within the light-emitting region. Light-emitting regions are in close contact with each other, such that a space of the display panel may be used to the maximum extent, and according to the geometric relation, D/e=f'/(f'+L), such that a relatively large eye box may be obtained.

It should be noted that the light-emitting regions are in close contact with each other, that is, regions where light-transmitting holes correspond to pixels are in close contact with each other in the preset light field drawing rule. Although a relatively large eye box may be obtained through this arrangement method, but the method will be affected by light ray deflection in a large field angle, regions corresponding to adjacent light-transmitting holes overlap with each other in a large field angle, and arrangement conflict may occur.

In some embodiments, as shown in FIG. 4, in the preset light field drawing rule, regions in which light-transmitting holes correspond to pixels are spaced from each other, that is, a distance between adjacent light-emitting regions is greater than 0. Since a distance between adjacent light-emitting regions is greater than 0, that is, regions corresponding to adjacent light-transmitting holes in a large field angle are not in close contact with each other, the regions corresponding to the adjacent light-transmitting holes in the large field angle may be prevented from overlapping.

It should be noted that during specific implementation, in the case of the solution in which the distance between adjacent light-emitting regions is greater than 0, pixels may still be normally arranged in regions other than the light-emitting regions, and the pixels other than the light-emitting regions do not emit light during display.

Figure 9:
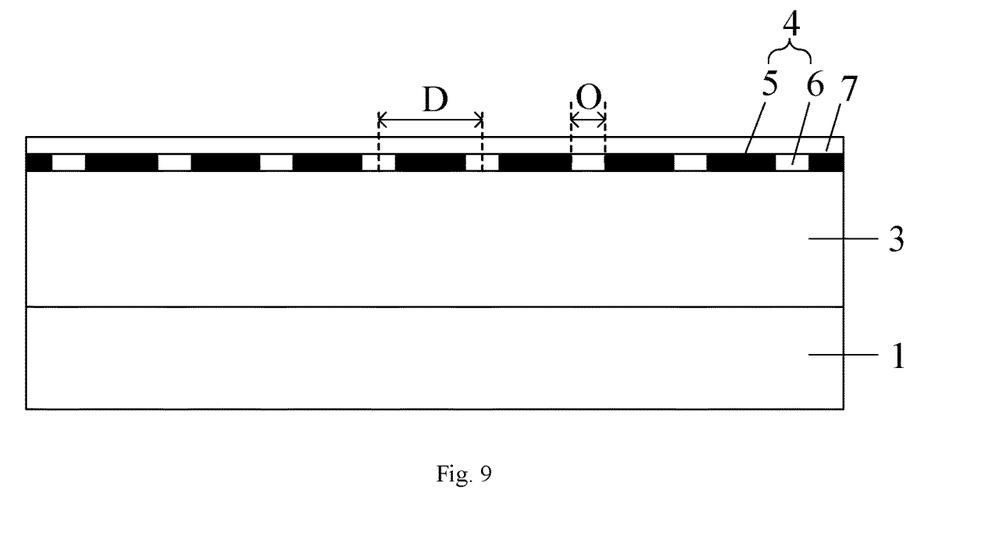
FIG. 9 is a schematic structural diagram of another display apparatus according to an embodiment of the present disclosure.

In some embodiments, as shown in FIG. 9, the display apparatus further includes a light-transmitting layer 7 located on a side of the light-shielding layer 5 facing away from the light-transmitting spacer layer 3.

During specific implementation, the light-transmitting layer may be used as a light-transmitting substrate for forming the light-shielding layer. That is, a light-shielding layer with light-transmitting holes may be formed on the light-transmitting layer, and then the side of the light-shielding layer facing away from the light-transmitting layer is attached to the light-transmitting spacer layer.

Under the condition that the light-transmitting layer is used as the light-transmitting substrate for forming the light-shielding layer, in some embodiments, the light-transmitting layer has a thickness of 0.5 mm. That is, the light-shielding layer may be formed on the light-transmitting substrate having a relatively less thickness such that increase in difficulty in manufacturing the light-shielding layer may be avoided.

In some embodiments, a material of the light-transmitting layer includes glass.

Alternatively, during specific implementation, the light-transmitting layer may be used as a protective film covering the light-shielding layer and the light-transmitting holes. That is, a light-shielding layer with light-transmitting holes may be manufactured on the light-transmitting spacer layer, and then a light-transmitting layer is arranged to cover the light-shielding layer, so as to protect the light-shielding layer with the light-transmitting holes and avoid damage to the light-shielding layer with the light-transmitting holes.

In some embodiments, a material of the light-transmitting spacer layer includes glass.

In some embodiments, the display panel may be an electroluminescent display panel, for example, an organic light-emitting diode display panel or a quantum dot light-emitting diode display panel. The display panel may be a liquid crystal display panel.

Figure 10:
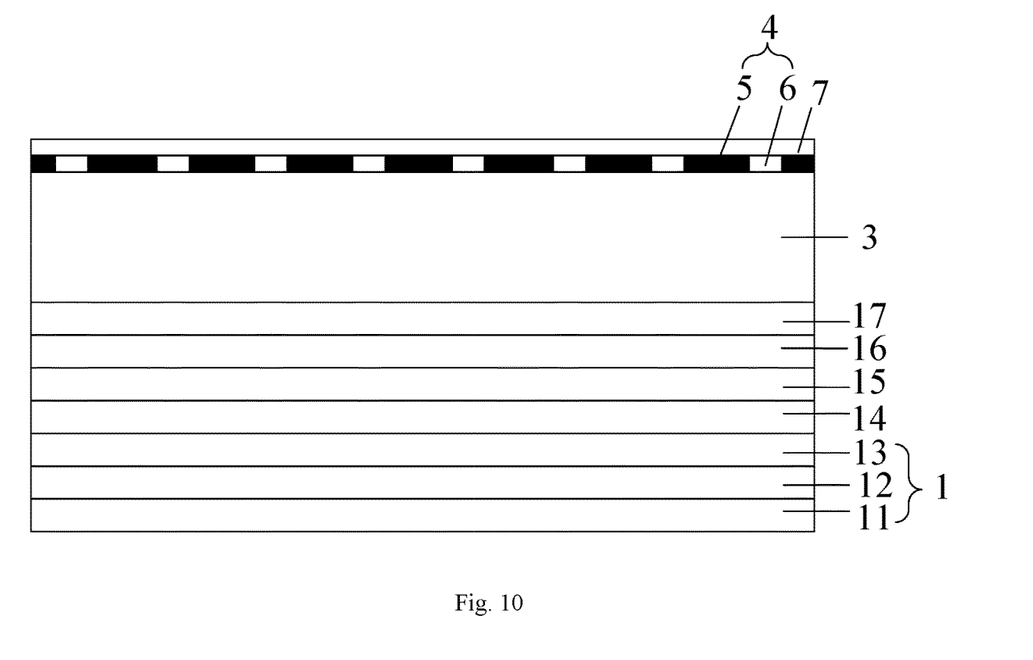
FIG. 10 is a schematic structural diagram of yet another display apparatus according to an embodiment of the present disclosure.

The display apparatus provided in an embodiment of the present disclosure may be a television, a mobile phone, etc. Under the condition that the display apparatus is a mobile phone, a liquid crystal display panel is taken as an example, as shown in FIG. 10, the display panel 1 includes: an array substrate 11, a liquid crystal layer 12 and an alignment substrate 13, and a polarizer 14, an adhesive 15, a covering protective layer 16 and a tempered glass protective layer 17 are arranged between the alignment substrate 13 and a light-transmitting spacer layer 3.

Next, by taking display apparatuses having different size as an example, a parameter design of the display apparatus provided in an embodiment of the present disclosure is illustrated. The display apparatus 1 has a size of 4.7 inches, and the display apparatus 2 has a size of 6.44 inches. As shown in Table 1, eye boxes e, viewing distances L, wavelengths $\lambda$ of emitted light, and refractive indexes n of the light-transmitting spacer layers of the display apparatuses 1 and 2 are the same. Therefore, the minimum distance D between the centers of two adjacent light-transmitting holes may be determined according to formula (9), and after the actual distance D between the centers of two adjacent light-transmitting holes is determined according to the minimum distance D between the centers of two adjacent light-transmitting holes, and an aperture O of the light-transmitting hole, angular resolution $\alpha$, a thickness f of the light-transmitting spacer layer, and the number N of sight points of a monocular entrance pupil are determined according to formulas (8), (11), (12) and (13), as shown in Table 2.

TABLE 1

| | P_p (μm) | e (mm) | Φ (mm) | L (mm) | λ (μm) | n |
|---|---|---|---|---|---|---|
| 1 | 13.725 × 36.6 | 3.5 | 10 | 50 | 0.55 | 1.49 |
| 2 | 74.25 × 74.25 | | | | | |

TABLE 2

| | Minimum D (mm) | D (mm) | O (μm) | f (mm) | α | Total number of sight points | N |
|---|---|---|---|---|---|---|---|
| 1 | 1.004 | 1.05 | 84 | 7.8 | 72.2 degrees | 76 × 29 | 26 × 10 |
| 2 | 1.112 | 1.28 | 93 | 9.5 | 88 degrees | 17 × 17 | 6 × 6 |

Figure 11:
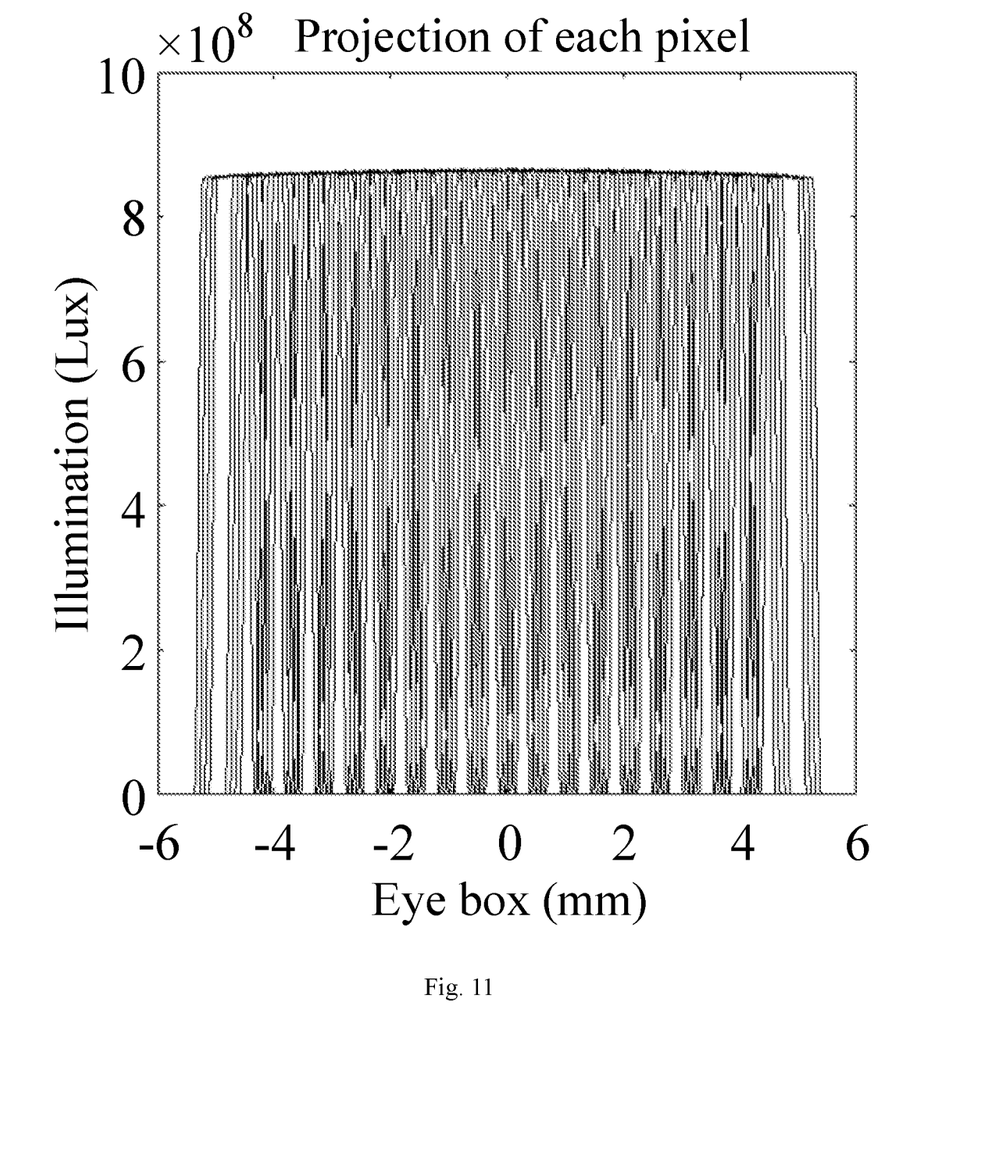
FIGS. 11 and 12 are simulated diagrams of projecting each pixel of a display apparatus in an eye box according to an embodiment of the present disclosure.
Figure 12:
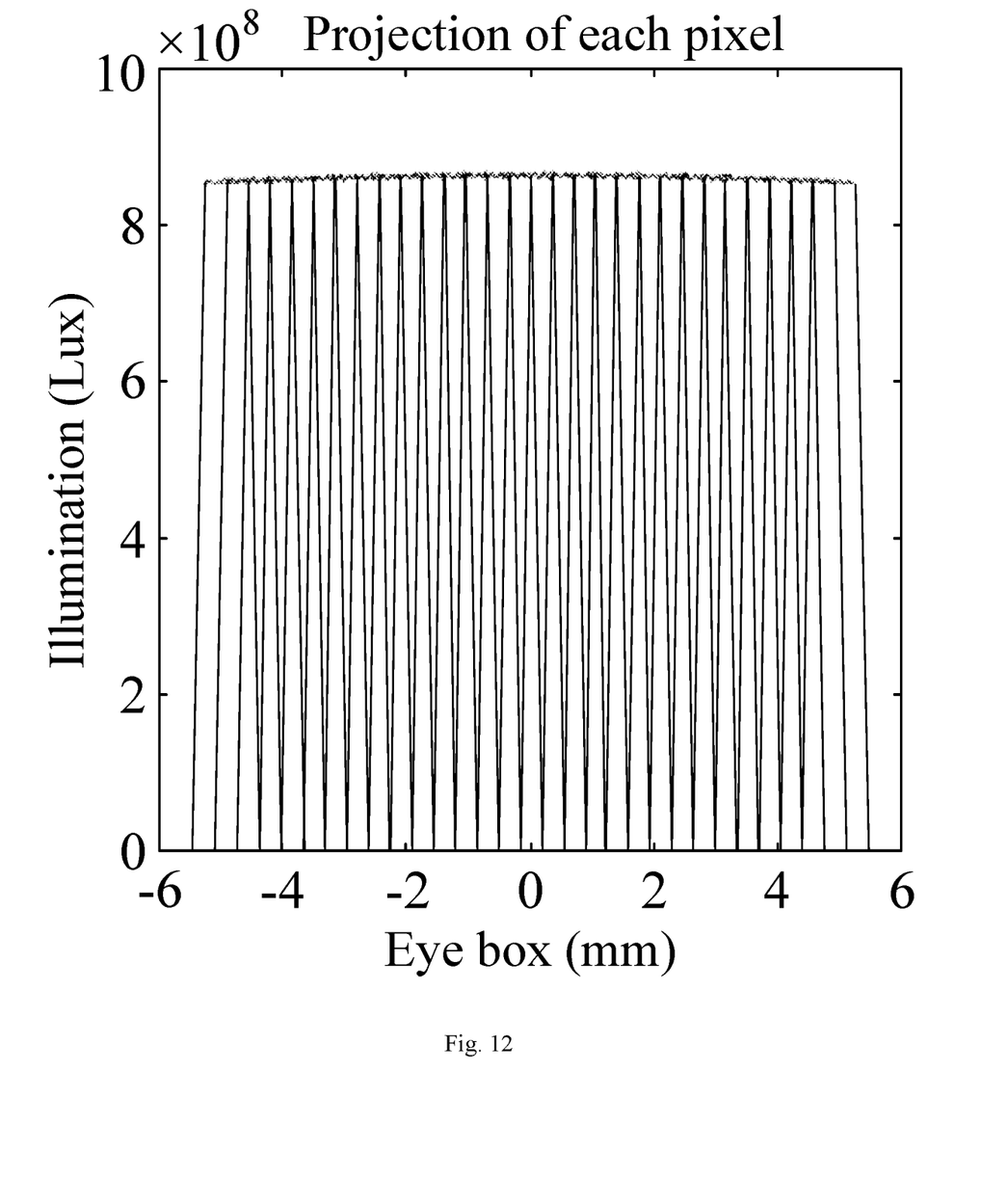

Simulation is carried out by taking the display apparatus 1 as an example, and simulation results are shown in FIGS. 11 and 12. In FIG. 11, the number of sight points projected to a 10-mm eye box in a first direction X is 76, and the number of sight points entering a pupil of a human eye is 26. In FIG. 12, the number of sight points projected to a 10-mm eye box in a second direction Y is 29, and the number of sight points entering a pupil of a human eye is 10.

Figure 13:
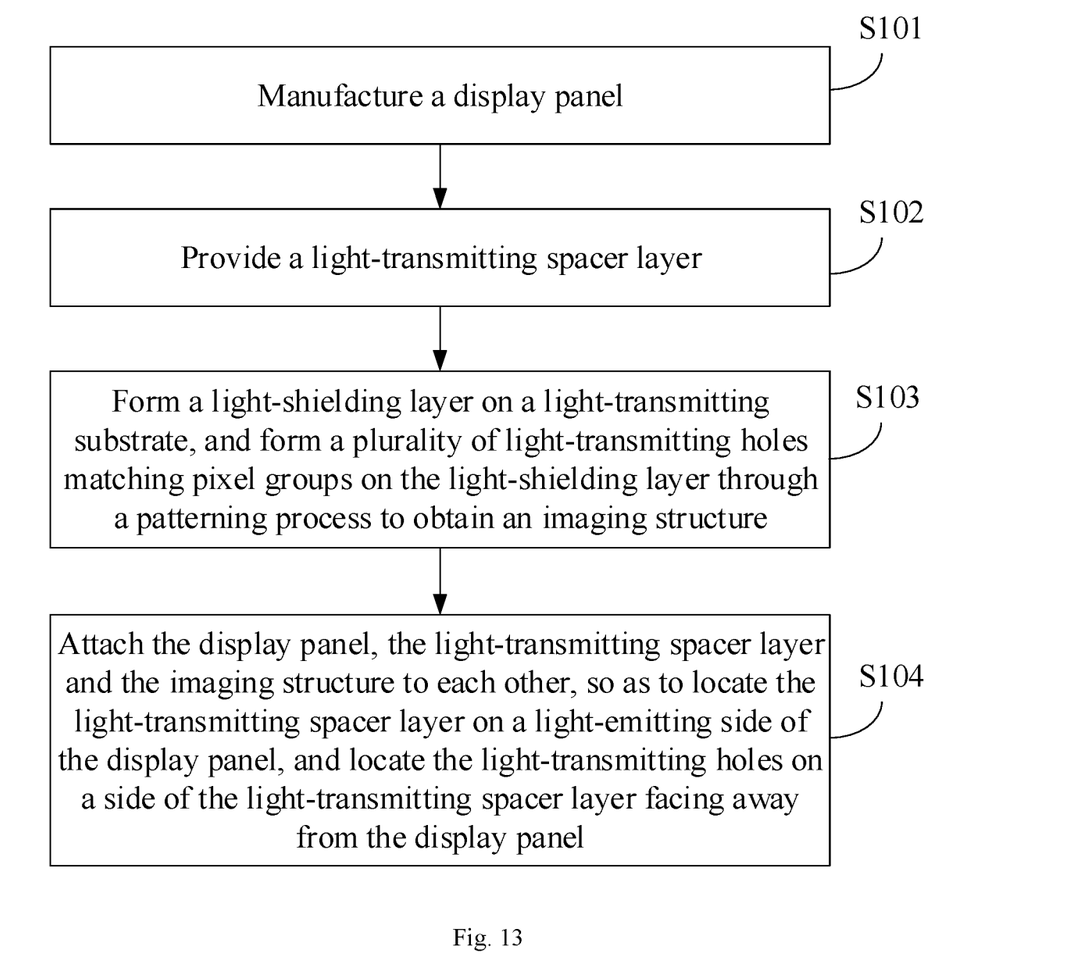
FIG. 13 is a schematic diagram of a method for manufacturing a display apparatus according to an embodiment of the present disclosure.

On the basis of the same inventive concept, an embodiment of the present disclosure further provides a method for manufacturing a display apparatus. As shown in FIG. 13, the method includes: S101: manufacture a displaying panel, where the display panel includes a plurality of pixel groups, and the pixel group includes a plurality of pixels; S102: providing a light-transmitting spacer layer; S103: forming a light-shielding layer on a light-transmitting substrate, and forming a plurality of light-transmitting holes matching the pixel groups on the light-shielding layer through a patterning process to obtain an imaging structure; and S104: attaching the display panel, the light-transmitting spacer layer and the imaging structure to each other, so as to locate the light-transmitting spacer layer on a light-emitting side of the display panel, and locate the light-transmitting holes on a side of the light-transmitting spacer layer facing away from the display panel; where light rays emitted by the pixels pass through the light-transmitting holes, and light rays emitted by at least two pixels pass through the light-transmitting holes so as to simultaneously enter a monocular pupil of a user.

During specific implementation, the light-shielding lay may be attached to the light-transmitting spacer layer first, and the side of the light-transmitting spacer layer facing away from the light-shielding layer is attached to the display panel.

During specific implementation, the light-transmitting substrate may be, for example, glass having a relatively smaller thickness, and the light-transmitting substrate may have a thickness of, for example, 0.5 mm. The light-shielding layer may be formed on the light-transmitting substrate having a relatively smaller thickness such that increase in difficulty in manufacturing a light-shielding layer may be avoided.

Alternatively, in some embodiments, the light-transmitting spacer layer is reused as the light-transmitting substrate; and the step of forming a light-shielding layer on a light-transmitting substrate specifically includes: forming the light-shielding layer on the light-transmitting spacer layer; and forming the light-transmitting holes on the light-shielding layer through the patterning process; and the step of attaching the display panel, the light-transmitting spacer layer and the imaging structure to each other specifically includes: attaching the side of the light-transmitting spacer layer facing away from the light-shielding layer to the display panel.

During specific implementation, the light-shielding layer has a thickness in a micron level, for example, less than 10 μm, and the light-shielding layer may be made of, for example, a black matrix material commonly used for a display panel.

That is, the light-shielding layer may be directly manufactured on the light-transmitting spacer layer, thereby reducing a flow for manufacturing a display apparatus.

In some embodiments, after the light-transmitting spacer layer is reused as the light-transmitting substrate, the light-shielding layer is formed on the light-transmitting spacer layer, and the light-transmitting holes are formed on the light-shielding layer through a patterning process, the method for manufacturing a display apparatus further includes: forming a light-transmitting layer on a side of the light-shielding layer facing away from the light-transmitting spacer layer.

Therefore, the formed light-transmitting layer may protect the light-shielding layer with the light-transmitting holes, and the subsequent process is prevented from damaging the light-shielding layer with the light-transmitting holes.

To sum up, according to the display apparatus and the method for manufacturing same provided in embodiments of the present disclosure, the imaging structure with light-transmitting holes are arranged on the light-emitting side of the display panel, and the distance between the imaging structure and the display panel is ensured by arranging the light-transmitting spacer layer between the imaging structure and the display panel. In this way, light rays emitted by different pixels in the display panel may reach a pupil of a human eye through the corresponding light-transmitting holes, and light rays emitted by at least two pixels may simultaneously enter a monocular pupil of a user through the light-transmitting holes. Therefore, 3D display of a near-to-eye light field may be implemented, monocular focusing and binocular convergence may be on one plane, and no visual fatigue and vertigo may occur. In addition, the process for providing light-transmitting holes is simple such that increase in difficulty in manufacturing the display apparatus may be avoided.

Although preferred embodiments of the present disclosure have been described, those skilled in the art can make additional changes and modifications to these embodiments once they learn the basic inventive concept. Therefore, the appended claims are intended to be interpreted as including preferred embodiments and all changes and modifications falling within the scope of the present disclosure.

Apparently, those skilled in the art can make various modifications and variations to embodiments of the present disclosure without departing from the spirit and scope of the present disclosure. In this way, if these modifications and variations of embodiments of the present disclosure fall within the scope of the claims of the present disclosure and their equivalent technologies, the present disclosure is further intended to include these modifications and variations.

What is claimed is:

1. A display apparatus, comprising:
   a display panel, comprising a plurality of pixel groups, wherein each of the pixel groups comprises a plurality of pixels;
   a light-transmitting spacer layer on a light-emitting side of the display panel; and
   an imaging structure on a side of the light-transmitting spacer layer facing away from the display panel, comprising a light-shielding layer, wherein the light-shielding layer comprises a plurality of light-transmitting holes matching the pixel groups; wherein light rays emitted by the pixels pass through the light-transmitting holes, and light rays emitted by at least two of the pixels pass through the light-transmitting holes so as to simultaneously enter a monocular pupil of a use;
   wherein a difference between light fluxes passing through any two different light-transmitting holes is less than a preset value, and the preset value is greater than or equal to 0;
   wherein the plurality of light-transmitting holes are arranged in an array in a first direction and a second direction, wherein the first direction intersects the second direction;
   different straight lines parallel to the first direction pass through the same number of light-transmitting holes; and different straight lines parallel to the second direction pass through the same number of light-transmitting holes;
   wherein a radius of each of image spots formed by the light rays emitted by the pixel groups passing through the light-transmitting holes is less than or equal to a distance between adjacent image points formed by the light rays emitted by the pixel groups passing through the light-transmitting holes;
   wherein an aperture of the light-transmitting hole and a distance between centers of two adjacent light-transmitting holes satisfy conditions as follows:

$$O = \sqrt{\frac{2.44\lambda DL}{e}}; \text{ and}$$

$$\frac{e\left(P_{-p} + \sqrt{\frac{2.44\lambda DL}{e}}\right)}{2DL} + \frac{1.22\lambda}{\sqrt{\frac{2.44\lambda DL}{e}}} \leq \frac{D}{L};$$

wherein O is an aperture of a light-transmitting hole, e is an eye box of the display apparatus, L is a distance between a human eye and the light-shielding layer, D is a distance between centers of the two adjacent light-transmitting holes, λ is a wavelength of a light ray emitted by the pixel, and P p is a pixel size.

2. The display apparatus according to claim 1, wherein a thickness f of the light-transmitting spacer layer satisfies a condition as follows:

$$f = \frac{D}{ne}L;$$

wherein n is a refractive index of the light-transmitting spacer layer.

3. The display apparatus according to claim 1, wherein the light ray emitted by each pixel corresponds to one sight point; and a number N of sight points of a monocular entrance pupil of the user satisfies a condition as follows:

$$N = \frac{\phi D}{eP_{-p}};$$

wherein φ is a diameter of a pupil.

4. The display apparatus according to claim 1, wherein each of the pixel groups comprises one light-emitting region, and only light rays emitted by the pixels in the light-emitting region pass through the light-transmitting holes during display.

5. The display apparatus according to claim 1, wherein the display apparatus further comprises a light-transmitting layer on a side of the light-shielding layer facing away from the light-transmitting spacer layer.

6. A method for manufacturing a display apparatus, comprising:
  manufacturing a display panel, wherein the display panel comprises a plurality of pixel groups, and the pixel group comprises a plurality of pixels;
  providing a light-transmitting spacer layer;
  forming a light-shielding layer on a light-transmitting substrate, and forming a plurality of light-transmitting holes matching the pixel groups on the light-shielding layer through a patterning process to obtain an imaging structure; and
  attaching the display panel, the light-transmitting spacer layer and the imaging structure to each other, so as to arrange the light-transmitting spacer layer on a light-emitting side of the display panel, and arrange the light-transmitting holes on a side of the light-transmitting spacer layer facing away from the display panel; wherein light rays emitted by the pixels pass through the light-transmitting holes, and light rays emitted by at least two of the pixels pass through the light-transmitting holes so as to simultaneously enter a monocular pupil of a user;
  wherein a difference between light fluxes passing through any two different light-transmitting holes is less than a preset value, and the preset value is greater than or equal to 0;
  wherein the plurality of light-transmitting holes are arranged in an array in a first direction and a second direction, wherein the first direction intersects the second direction;
  different straight lines parallel to the first direction pass through the same number of light-transmitting holes; and different straight lines parallel to the second direction pass through the same number of light-transmitting holes;
  wherein a radius of each of image spots formed by the light rays emitted by the pixel groups passing through the light-transmitting holes is less than or equal to a distance between adjacent image points formed by the light rays emitted by the pixel groups passing through the light-transmitting holes;
  wherein an aperture of the light-transmitting hole and a distance between centers of two adjacent light-transmitting holes satisfy conditions as follows:

$$O = \sqrt{\frac{2.44\lambda DL}{e}}; \text{ and}$$

-continued $$\frac{e\left(P_{-p} + \sqrt{\frac{2.44\lambda DL}{e}}\right)}{2DL} + \frac{1.22\lambda}{\sqrt{\frac{2.44\lambda DL}{e}}} \leq \frac{D}{L};$$

wherein O is an aperture of a light-transmitting hole, e is an eye box of the display apparatus, L is a distance between a human eye and the light-shielding layer, D is a distance between centers of the two adjacent light-transmitting holes, λ is a wavelength of a light ray emitted by the pixel, and P p is a pixel size.

7. The method according to claim 6, wherein the light-transmitting spacer layer is reused as the light-transmitting substrate; the forming a light-shielding layer on a light-transmitting substrate specifically comprises:
  forming the light-shielding layer on the light-transmitting spacer layer; and
  forming the light-transmitting holes on the light-shielding layer through the patterning process; and
  the attaching the display panel, the light-transmitting spacer layer and the imaging structure to each other specifically comprises:
  attaching a side of the light-transmitting spacer layer facing away from the light-shielding layer to the display panel.

8. The display apparatus according to claim 1, wherein a number of pixel groups is equal to a number of light-transmitting holes.

9. The display apparatus according to claim 1, wherein a shape of an orthographic projection of each of the light-transmitting holes on a plane on which the display apparatus is located is circular.

10. The display apparatus according to claim 1, wherein numbers of the light-transmitting holes in different rows are the same, and numbers of the light-transmitting holes in different columns are the same.

11. The display apparatus according to claim 1, wherein in the first direction, distances between centers of any two adjacent light-transmitting holes are equal to each other, in the second direction, distances between centers of any two adjacent light-transmitting holes are equal to each other, and distances between the centers of any two adjacent light-transmitting holes in the first direction are equal to the distances between the centers of any two adjacent light-transmitting holes in the second direction.

12. The display apparatus according to claim 5, wherein the light-transmitting layer may be used as a light-transmitting substrate for forming the light-shielding layer.

13. The display apparatus according to claim 5, wherein a thickness of the light-transmitting layer is 0.5 mm.

14. The display apparatus according to claim 5, wherein a material of the light-transmitting layer comprises glass.

15. The display apparatus according to claim 1, wherein a thickness of the light-shielding layer is less than 10 μm.

* * * * *